Sept. 16, 1969　　　G. W. STEINIGER　　　3,466,921
APPARATUS FOR REMOVING DENTS FROM TUBING
AND SIMILAR ARTICLES
Filed March 1, 1968　　　　　　　　　　　2 Sheets-Sheet 1

INVENTOR.
GEORGE W. STEINIGER.
BY James A. Berneburg
　his ATTORNEY.

Sept. 16, 1969  G. W. STEINIGER  3,466,921
APPARATUS FOR REMOVING DENTS FROM TUBING
AND SIMILAR ARTICLES
Filed March 1, 1968  2 Sheets-Sheet 2

INVENTOR.
GEORGE W. STEINIGER
BY
James A. Berneburg
his ATTORNEY.

United States Patent Office 3,466,921
Patented Sept. 16, 1969

3,466,921
APPARATUS FOR REMOVING DENTS FROM
TUBING AND SIMILAR ARTICLES
George W. Steiniger, Wallingford, Conn., assignor to
Allegheny Ludlum Steel Corporation, Brackenridge,
Pa., a corporation of Pennsylvania
Filed Mar. 1, 1968, Ser. No. 709,555
Int. Cl. B21d *41/02;* B21j *9/18*
U.S. Cl. 72—393                            8 Claims

ABSTRACT OF THE DISCLOSURE

Apparatus adapted to be removably positioned within the bore of an elongated section of dented tubing or similar article, the apparatus comprising, in combination, an expansible head conforming to the internal configuration of said bore having a plurality of sections held in cooperative relationship by biasing means and expanding means adapted to engage and expand said head to correspond to the internal dimensions of said bore, said biasing means acting to return said head sections into cooperative relationship upon disengagement of said expanding means from said head.

Background of the invention

This invention relates to an apparatus for removing dents from members having a passageway therethrough, and more particularly to an apparatus for removing dents from elongated tubing and similar articles.

Tubing in general, and thin walled tubing in particular, is susceptible to denting in all stages of its production, treatment, handling and storage. Heretofore the dented tubing was for most intended applications rendered useless, and the normal practice, where the length of tubing was such to make the practice feasible, was to cut out the dented section and to utilize the salvaged sections in those applications where shorter length tubing was required. In the production of short length tubing, when the tubing was dented it was impractical to cut out the damaged section, and the length was scrapped. This practice was both expensive and time consuming.

A further approach to removing the dents was to draw a die through the length of the dented tubing; however, this practice was unsatisfactory since it did not adequately restore the tubing to its original shape, and further, in most instances, the die scarred the internal surface of the tubing, rendering it useful in only limited applications.

It is accordingly an object of this invention to provide a novel, simplified dent-removing apparatus.

It is a further object of this invention to provide a novel, simplified dent-removing apparatus that can be utilized to remove dents from elongated tubing and similar articles.

It is a further and more specific object of this invention to provide a novel and simplified dent-removing apparatus that can be utilized for removing dents from tubing and similar articles of indeterminate length and which is readily adaptable for integration into mill production.

Summary of the invention

In accordance with the invention, an expansible head is removably positioned within the bore, or longitudinal opening, of an elongated section of dented tubing or similar article immediately adjacent the dents. The head, conforming to the configuration of the bore of the tubing, has a plurality of sections held in cooperative relationship by biasing means, a longitudinal axial bore therethrough, and enlarged end-openings communicating with said bore, the walls connecting the axial bore and the end-opening taper outwardly to form an inclined surface between the two. Expanding means are provided and are adapted to simultaneously engage each of the head end openings and progressively the head bore, thereby forcing the head sections out of contiguous relationship and expanding the head to substantially equal the internal dimensions of the bore of the dented tubing or similar article, thereby removing the dent from the same. Upon disengagement of the expanding means from the head bore and end openings, the biasing means act to return the head sections into contiguous relationship and the apparatus can be removed from the bore or similar article.

Brief description of the drawings

The above and other objects and features of the invention will become apparent from the following detailed description taken in connection with the accompanying drawings which form a part of this specification and in which.

Description of the preferred embodiment

Figure 1:
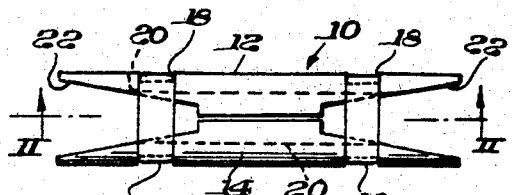
FIGURE 1 is a view in side elevation of the expansible head.
Figure 2:
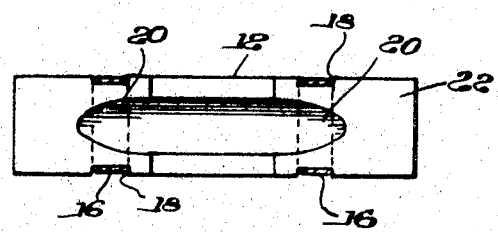
FIG. 2 is a view taken along the line II—II of FIG. 1.
Figure 3:
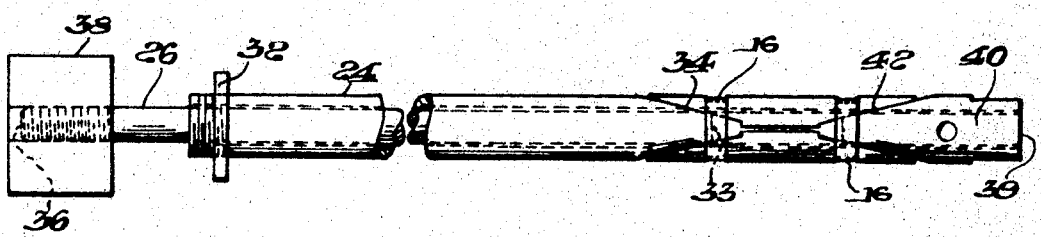
FIG. 3 is a view of the assembled apparatus of the invention partly schematic with parts broken away to show detail.
Figure 4:
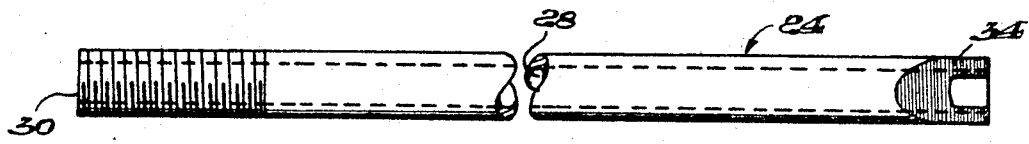
FIG. 4 is a view in top elevation of the expanding tube.
Figure 5:
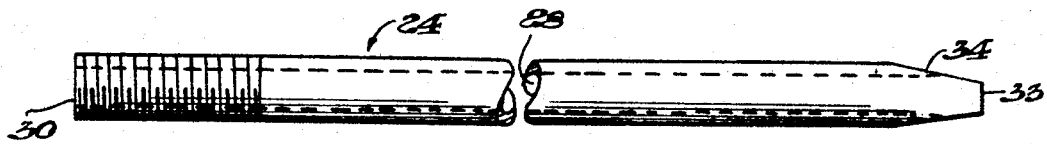
FIG. 5 is a view in side elevation of the expanding tube.
Figure 6:
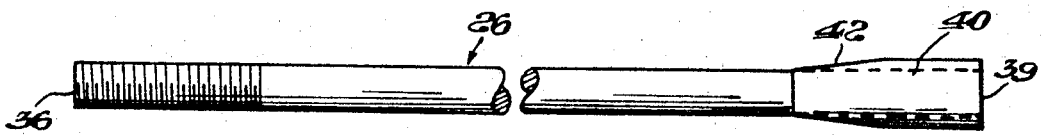
FIG. 6 is a view in side elevation of the expanding rod showing an optical embodiment of the enlarged section attached thereto.

Referring now to the drawings, an expansible head 10 is shown comprising a first section 12 and a second section 14. The sections are held in cooperative relationship by springs 16 lying in circumferential grooves 18 below the surface of sections 12 and 14. The head has a longitudinal axial bore 20 therethrough, and enlarged tapered end openings 22 communicating with the bore. Means to expand the head are provided in the form of an expanding tube 24 and an expanding rod 26. The expanding tube having an outside diameter smaller than the inside diameter of the tube from which the dents are to be removed, has a bore 28 therethrough, and a first end 30 anchored to a base 32; the second end terminates in a taper 34. The expanding rod 26 is slidably positioned within the expanding tube bore 28 and has a first end 36, extending beyond the tube first end 30, operably engaged with a power means 38. The rod second end 39 extends beyond the tube second end 33 and terminates in an enlarged section 40 having a reverse taper 42.

The expansible head 10 is positioned surrounding the tube taper 34 and the rod taper 42. As the power means 38 is actuated, the rod 26 is drawn through the bore 28 so as to bring taper 42 closer to taper 34 within tapered openings 22, and progressively bore 20, thereby expanding head 10 by forcing sections 12 and 14 apart a distance substantially equal to the internal diameter of the tube from which the dents are to be removed. The power means are then reversed so that rod 26 is forced out of bore 20 and away from taper 34, the springs 16 returning sections 12 and 14 into original relationship. The enlarged rod section can be removably secured to the rod second end by means of a pin, or it may be press-fit to the rod.

While the preferred embodiment is shown in apparatus for removing dents from tubing having a cylindrical bore therethrough, it is obvious that by varying the external configuration of the head to match the configuration of the bore through the dented tubing it is possible to have an expansible head having a plurality of sections capable of removing dents from tubing of any shape. Further, although the expanding means of the preferred embodiment have tapered ends to engage the expansible head, such may be varied at will to accomplish a similar result. Still further, the biasing means utilized may be of any type suitable to return the head sections into cooperative releationship upon disengagement of the expanding means from the head.

Although a preferred embodiment of this invention has been shown and described, it is to be understood that various adaptations and modifications may be made without departing from the scope of the appended claims.

I claim:

1. An apparatus for removing dents from members having a passage therethrough comprising, in combination:
  (a) an expansible head for positioning within said passage immediately adjacent said dents, said head having a plurality of sections held in cooperative relationship by biasing means, a longitudinal axial bore therethrough and enlarged opposed end openings communicating with said bore, and
  (b) expanding means positioned to simultaneously engage each of said end openings and progressively said bore, said means expanding said head to substantially the internal dimensions of said passage, thereby removing dents from said member, said biasing means acting to return said head sections into cooperative relationship upon disengagement of said expanding means from said bore and said end openings.

2. An apparatus according to claim 1 in which said biasing means are springs and said expanding means are elongated tapered members.

3. An apparatus according to claim 2 in which said elongated tapered members are actuated by a power means.

4. An apparatus for removing dents from tubing and similar articles, comprising, in combination:
  (a) an elongated tube having a first end and a second end, said second end terminating in a taper,
  (b) an elongated rod, slidably positioned within said tube, said rod having a first end and a second end, said first end extending beyond said tube first end, said second end extending beyond said tube second end and terminating in an enlarged section having a reverse taper.
  (c) an expansible head for positioning within said dented tubing immediately adjacent said dents, said head having a plurality of sections held in cooperative relationship by biasing means, a longitudinal axial bore therethrough and enlarged opposed end openings communicating with said bore, said head adapted to be positioned surrounding said tube taper and said rod taper, whereby as said rod is actuated to simultaneously draw said tube taper and said rod taper together, engaging said end openings and progressively said bore, said head is expanded to substantially correspond to the internal dimensions of said dented tubing thereby removing dents from same, said biasing means acting to return said head sections into cooperative relationship upon disengagement of said tube taper and said rod taper from said bore and said end openings.

5. An apparatus according to claim 4 in which said enlarged section is removably secured to said rod second end, said biasing means are springs and said rod is actuated by a power means.

6. An apparatus for removing dents from tubing and similar articles, comprising, in combination:
  (a) a base,
  (b) an elongated tube having a first end and a second end, said first end being anchored to said base and said second end terminating in a taper,
  (c) a power means,
  (d) an elongated rod slidably positioned within said tube, said rod having a first end and a second end, said first end extending beyond said tube first end being operably engaged with said power means, said second end extending beyond said tube second end, terminating in an enlarged section having a reverse taper,
  (e) an expansible head for positioning within said dented tubing immediately adjacent to said dents, said head having a plurality of sections held in cooperative relationship by biasing means, a longitudinal axial bore therethrough and enlarged opposed end openings communicating with said bore, one of said end openings complementary to said tube taper and said opposed end opening complementary to said rod taper, said head adapted to be positioned surrounding said tube taper and said rod taper, whereby as said power means is actuated said rod is drawn through said tube bringing said tube taper and said rod taper into simultaneous engagement with said end openings and progressively with said bore, expanding said head to correspond to substantially the internal dimensions of said dented tubing, removing dents from same, said biasing means acting to return said head sections into cooperative relationship upon disengagement of said tube taper and said rod taper from said bore and said end openings as said power means is reversed.

7. A device according to claim 6 in which said enlarged section is removably secured to said rod second end and said biasing means are springs located below the external surface of said head.

8. A device according to claim 6 in which said tube taper and said rod taper are dimensionally equal and opposite.

References Cited

UNITED STATES PATENTS 2,142,017  12/1938  Riemenschneider et al. _ 72—393

RONALD D. GREFE, Primary Examiner

U.S. Cl. X.R.

72—452